Inventors:
Shimshon Ernst Nothmann
Benno Friedmann

Patented Feb. 24, 1953

2,629,258

UNITED STATES PATENT OFFICE 2,629,258

RECORDING RAIN GAUGE

Shimshon Ernst Nothmann and Benno Friedmann, Tel-Aviv, Israel

Application March 1, 1951, Serial No. 213,308
In Israel March 8, 1950

2 Claims. (Cl. 73—171)

This invention relates to recording rain gauges of the weighing or balance type wherein a balance beam carries at one end a counterpoised rain collector vessel and merges at the other end with an arm provided with a writing implement for recording on a chart the increase of weight of the collector due to the collecting rain water. When the collector has taken in so much water that the writing implement reaches the end of its recording range at the upper edge of the chart, the collector is emptied.

In some known rain gauges of this kind the collector is emptied automatically in that the balance beam is made, in a certain position, to strike a control member which is thereby made to open an outlet in the lower part of the collector. This arrangement has the drawback that the actuation of the control member by the balance beam brakes the latter whereby the rain record is falsified. The present invention has the object to overcome this drawback.

The invention consists in a rain gauge of the kind referred to, wherein the collector encloses a float arranged to operate an outflow control member so as to allow the outflow of water from the collector when the float reaches a pre-determined high level.

It is preferred to make the outlet in the form of an overflow siphon cooperating with a bell arranged to be lifted by the float and to be dropped when the latter has reached a pre-determined level, and thereby to start the emptying of the collector by siphon action.

An embodiment of the invention is illustrated, by way of example only, in the accompanying drawings in which.

Figure 1:
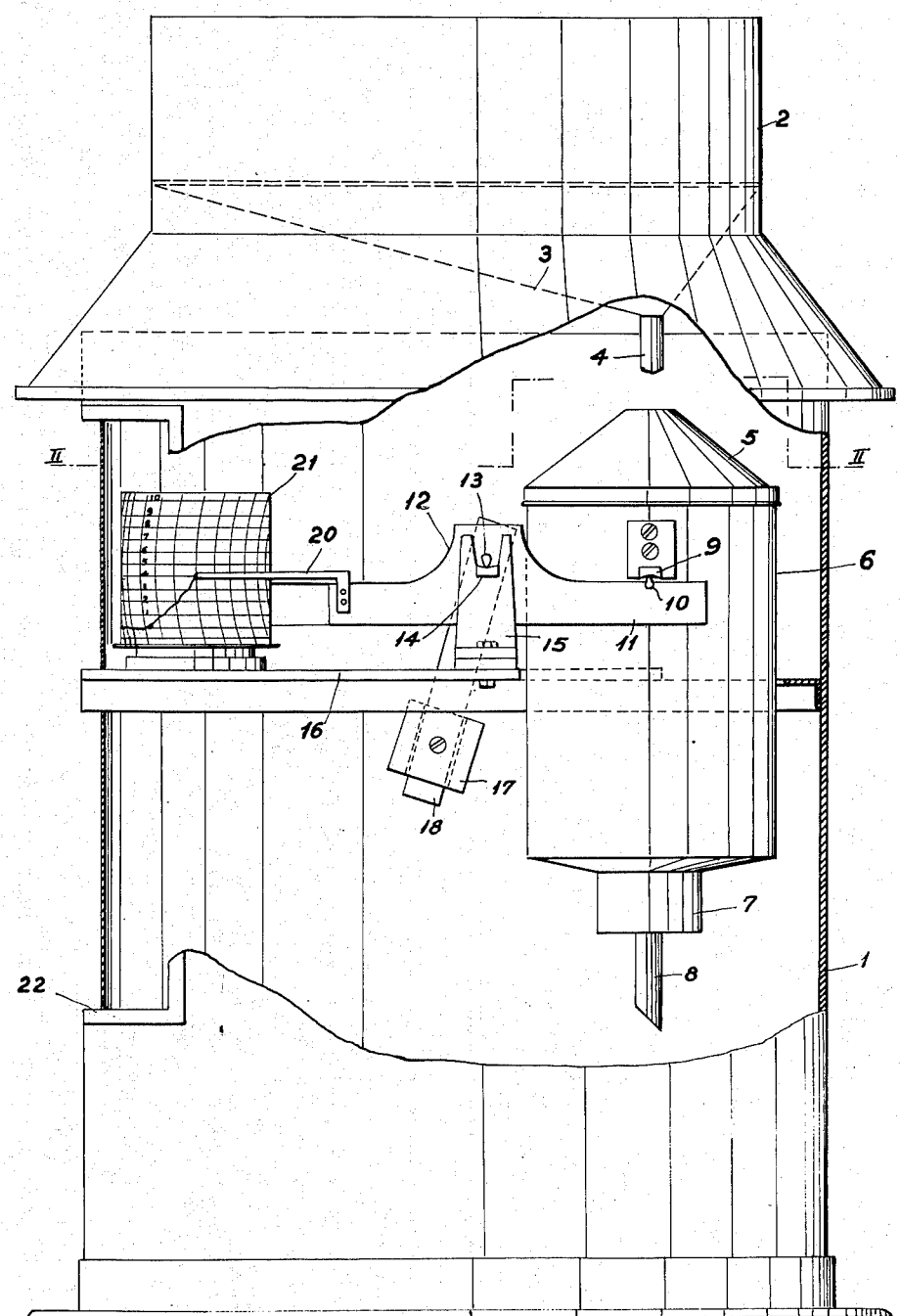
Fig. 1 is a side elevation of a rain gauge of the kind to which the invention refers, part of the casing being broken away.
Figure 2:
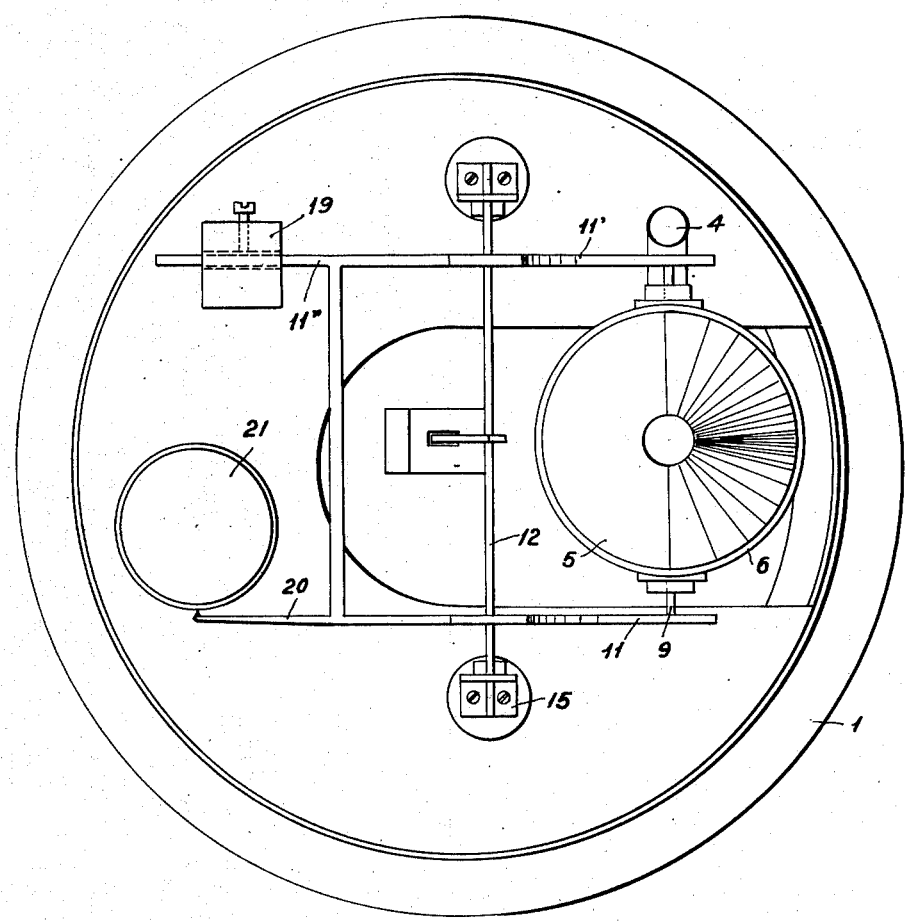
Fig. 2 is a cross section on line II—II of Fig. 1.

The arrangement of the rain gauge as shown in Figs. 1 and 2 is known in principle. The instrument is enclosed in a casing 1 closed at its top by a lid 2 including a collecting surface 3 of standardized area. This surface is drained by a conduit 4 which opens into a funnel (not shown) leading into the bottom part of the upright-cylindrical collector 6. The collector has a hood 5. Its bottom is centrally depressed and forms a pit 7 from which an outflow tube 8 opens freely into the bottom part of the casing. By means of laterally extending inverted bearings 9 the collector rests on knives 10 provided at one end of each longitudinal member 11, 11' of a forked balance beam whose transverse member 12 rests on knives 13 supported on bearings 14. The latter are supported by short columns 15 mounted on rails 16 within the casing. A balance weight 17 is mounted on an arm 18 secured to the member 12 of the beam in order to counterbalance the collector. A further weight 19 is slidably arranged on an extension 11'' of the beam member 11' and serves for the fine adjustment of the beam. In continuation of the beam member 11 a writing implement 20 extends to the chart drum 21. A window 22 is provided in the casing in order to allow observation of the chart. The collector is so poised by the two weights that when it is empty the writing implement occupies zero position at or near the lower edge of the recording chart. The capacity of the collector is so calculated that emptying thereof (see below) takes place when the writing implement has nearly reached the upper edge of the chart.

Figure 3:
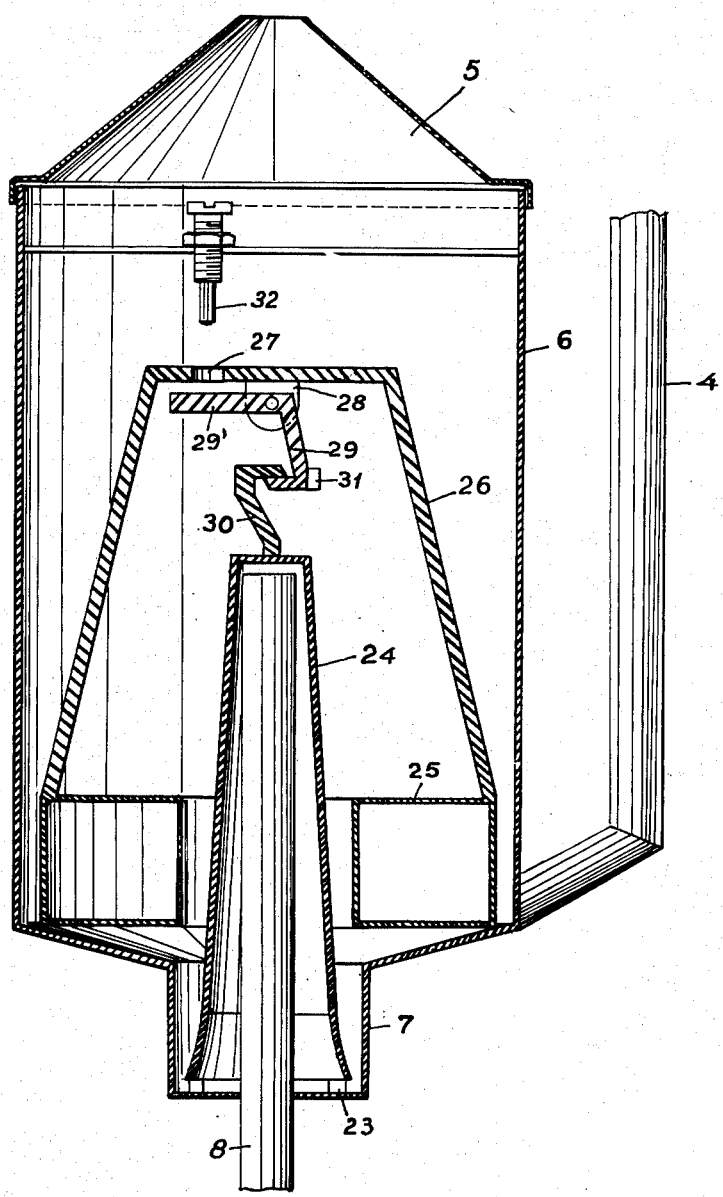
Fig. 3 is a vertical axial section, drawn to a larger scale, of the collector which is constructed in accordance with the invention.

Fig. 3 shows the arrangement of the collector in accordance with this invention. In the pit 7 of the collector bottom small supporting blocks or projections 23 for the siphon bell 24 are provided. The vertical outlet tube 8 projects through the pit bottom up into the collector to about half the height of the latter, and the bell is so high that when it rests on the supports 23 its top is slightly above the upper end of the tube 8. The collector houses a float 25, e. g. a hollow sheet metal ring, which may be guided by suitable guide means (not illustrated) so as to be able to move vertically but not to displace itself laterally or angularly. The float carries a yoke 26 whose transverse member has an aperture 27. In lugs 28 provided in central position of the transverse yoke member, a hook 29 is pivoted. It serves for interengagement with a hook 30 fixed to the top of bell 24, and is urged into engaging position by a weight 31. In this position, the tail 29' of hook 29 lies beneath the aperture 27. Above the latter a pin 32 projects downwards from the top part of the collector.

As rain water rises in the collector to a level above the pit 7, the float 25 begins to rise and takes the bell 24 with it until the pin 32, penetrating through the aperture 27, strikes the tail 29' of hook 29 which is thereby swung round its pivot anticlockwise and releases the bell. The latter drops and, in the known way of overflow siphons, pushes into the tube 8 a quantity of water sufficient to start uninterrupted outflow from the collector until the latter is nearly empty. The float sinks back onto the collector bottom, the hook 29 strikes hook 30 on its chamfered edge, is thereby pushed back and, after passing the hook 30, urged back into interengagement therewith by the weight 31, and thus the operation of the gauge can continue. The sudden lessening of the weight of the collector makes the latter rise and thereby lowers the writing implement back into zero position.

It has been ascertained that with a rain gauge of conventional size, the emptying operation can be completed in a few seconds so that there is virtually no interruption of the recording operation.

Obviously the rise of the float within the collector is an "internal" matter and does not affect the intended normal operation of the balance which is subject to no other influence than the increase of weight of the collector by the rain water and the drop of weight owing to the outflow of water from the collector so that the record truly reflects the processes which it is intended to show.

We claim:

1. A recording rain gauge comprising in combination a two-armed balance beam, a recording implement at the end of one arm of the balance beam, a rain collector vessel balanced on the other arm of the balance beam, a weight counterpoising the collector vessel, a vertical outflow tube in the bottom of the collector vessel and extending upwards into the latter, a siphon bell within the collector vessel enclosing said inner extension of the outflow tube, a float in the collector vessel adapted to rise therein in proportion to the amount of rain water collecting in the vessel, detachable means connecting the siphon bell to the float for allowing the float as it rises to lift the bell, and means for detaching said connecting means in the pre-determined high-level position of the float in the collector in response to arrival of the float at said high-level position, thereby allowing the siphon bell to drop back and thereby to start the evacuation of the rain water from the collector vessel by siphon action.

2. A recording rain gauge comprising in combination a two-armed balance beam, a recording implement at the end of one arm of the balance beam, a rain collector vessel balanced on the other arm of the balance beam, a weight counterpoising the collector vessel, a vertical outflow tube in the bottom of the collector vessel and extending upwards into the latter, a siphon bell within the collector vessel enclosing said inner extension of the outflow tube, a float in the collector vessel adapted to rise therein in proportion to the amount of rain water collecting in the vessel, a yoke mounted on the float and overhanging the siphon bell, interengaging hooks respectively secured on top of the yoke and pivotally mounted on top of the bell, an abutment in the collector vessel adapted to strike one of said hooks in the pre-determined high-level position of the float in the collector vessel, and thereby to sever the mutual engagement of the hooks.

SHIMSHON ERNST NOTHMANN.
BENNO FRIEDMANN.

REFERENCES CITED

The following references are of record in the file of this patent:

UNITED STATES PATENTS

| Number | Name | Date |
|---|---|---|
| 1,752,620 | Swindin | Apr. 1, 1930 |
| 2,468,692 | Stevens | Apr. 26, 1949 |

OTHER REFERENCES

Article entitled "A New Recording Raingauge," by A. Hauer in the Journal of Scientific Instruments, vol. 28, #3, March 1951, pages 84–85.